US011799948B2

(12) United States Patent
Barton et al.

(10) Patent No.: US 11,799,948 B2
(45) Date of Patent: Oct. 24, 2023

(54) CLOUD SERVICE DATACENTER SELECTION BASED ON DATA SOVEREIGNTY POLICIES

(71) Applicant: Cisco Technology, Inc., San Jose, CA (US)

(72) Inventors: Robert Edgar Barton, Richmond (CA); Jerome Henry, Pittsboro, NC (US); Maik Guenter Seewald, Nuremberg (DE)

(73) Assignee: Cisco Technology, Inc., San Jose, CA (US)

( * ) Notice: Subject to any disclaimer, the term of this patent is extended or adjusted under 35 U.S.C. 154(b) by 213 days.

(21) Appl. No.: 16/950,132

(22) Filed: Nov. 17, 2020

(65) Prior Publication Data

US 2022/0159064 A1 May 19, 2022

(51) Int. Cl.
*H04L 67/1004* (2022.01)
(52) U.S. Cl.
CPC .............. *H04L 67/1004* (2013.01)
(58) Field of Classification Search
CPC ... H04L 67/1004; H04L 43/10; H04L 47/125; H04L 45/126; H04L 63/00; H04L 67/02; H04L 67/1097; H04L 67/141; H04L 67/148; H04L 67/34; H04L 67/52; H04L 67/10; G06F 9/445
See application file for complete search history.

(56) References Cited

U.S. PATENT DOCUMENTS

| 7,058,706 | B1 | 6/2006 | Iyer et al. |
| 10,817,619 | B1* | 10/2020 | Kolli ................. G06F 21/552 |
| 11,323,919 | B1* | 5/2022 | Parulkar ............ H04W 36/0011 |
| 2011/0082916 | A1 | 4/2011 | Swanson et al. |
| 2015/0319063 | A1 | 11/2015 | Zourzouvillys |
| 2016/0125195 | A1* | 5/2016 | Plumb ................. G06F 21/6218 726/30 |
| 2016/0150076 | A1* | 5/2016 | Foladare .............. H04W 4/029 370/259 |
| 2017/0134476 | A1* | 5/2017 | Palanivel ................. G06F 8/60 |
| 2018/0300496 | A1 | 10/2018 | Shriver et al. |
| 2019/0228092 | A1* | 7/2019 | Reyes ................ G06F 16/1865 |
| 2019/0230189 | A1* | 7/2019 | Keller ................ H04L 67/1021 |
| 2021/0248252 | A1* | 8/2021 | Darji ...................... G06F 3/062 |

* cited by examiner

*Primary Examiner* — Benjamin M Thieu
(74) *Attorney, Agent, or Firm* — Lee & Hayes, P.C.

(57) ABSTRACT

Cloud services are provided by a distributed network including a number of geographically distributed datacenters, to client devices in accordance with data sovereignty requirements. A server within the distributed network may receive a service request and determine whether it complies with the data sovereignty requirements of the client. When the geographic location of the server does not comply with the client's data sovereignty requirements, the server may determine and transmit back to the client device a set of alternative datacenters within the distributed network that comply with the client's data sovereignty requirements. The client device may use network probes to select an alternative datacenter, and the cloud service request of the client device may be migrated from the server to the selected datacenter.

20 Claims, 8 Drawing Sheets

CLOUD SERVICE DATACENTER SELECTION BASED ON DATA SOVEREIGNTY POLICIES

TECHNICAL FIELD

The present disclosure generally relates to providing software services via computer networks. In particular, the present disclosure relates to providing services by a cloud computing network of distributed datacenters, including techniques for selecting datacenters to provide the cloud services based on compliance with client-specific data sovereignty policies.

BACKGROUND

A cloud computing network provides cloud services and/or other computing resources to client devices via remote cloud servers. Cloud (or cloud-based) services provide various applications, network functionality, and data resources to client devices via computer networks (e.g., the Internet), reducing the need for individuals and organizations to maintain large internal computing infrastructures. Cloud services offered via cloud computing networks may include Software-as-a-Service (Saas), Infrastructure-as-a-Service (IaaS), and Platform-as-as-Service (PaaS), which may be delivered via public, private, and/or hybrid cloud implementations. Cloud services provide customers with increased flexibility and scalability, as well as lower costs for software licenses, computer hardware infrastructures, and maintenance personnel.

Cloud services may be provided via a cloud computing network including a number of geographically distributed datacenters. For example, content delivery networks (CDNs) include geographically distributed networks of web servers storing replicated content resources, allowing users to access the closest web server to receive content. Additional cloud services such as secure data services, network security services, gateway and firewall services, and the like, may use similar network architectures in which a client device accesses the service from the datacenter closest to the client device. Specialized routing techniques are often used within CDNs and other distributed network architectures, used to route the client request to the nearest server. For instance, Anycast is a network addressing and routing technique in which incoming requests from client devices are routed to the geographically nearest datacenter with capacity to process the request. Using Anycast, network routers may select an optimal path for the request based on the number of hops, overall distance, lowest cost, latency measurements or based on the least congested, etc. Thus, an Anycast network provides advantages in performance, reliability, and load balancing for providing network-based services from a group of geographically distributed servers.

However, Anycast networks and other distributed network architectures may be unable to support the data sovereignty policies required by customer organizations using the networks to access cloud services. For instance, data sovereignty policies associated with an organization may define the countries or other geographic regions from which a client device may access specific types of data. Data sovereignty policies based on jurisdictional laws and/or client security policies may prohibit client devices from transferring confidential or sensitive data (e.g., financial data, health care data, governmental data, etc.) to or from servers in specific jurisdictions. Anycast, multicast, and/or other routing techniques for distributed networks that rely on DNS services, however, are not configured to determine routing decisions based on data sovereignty requirements or the geographic locations of the network servers.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
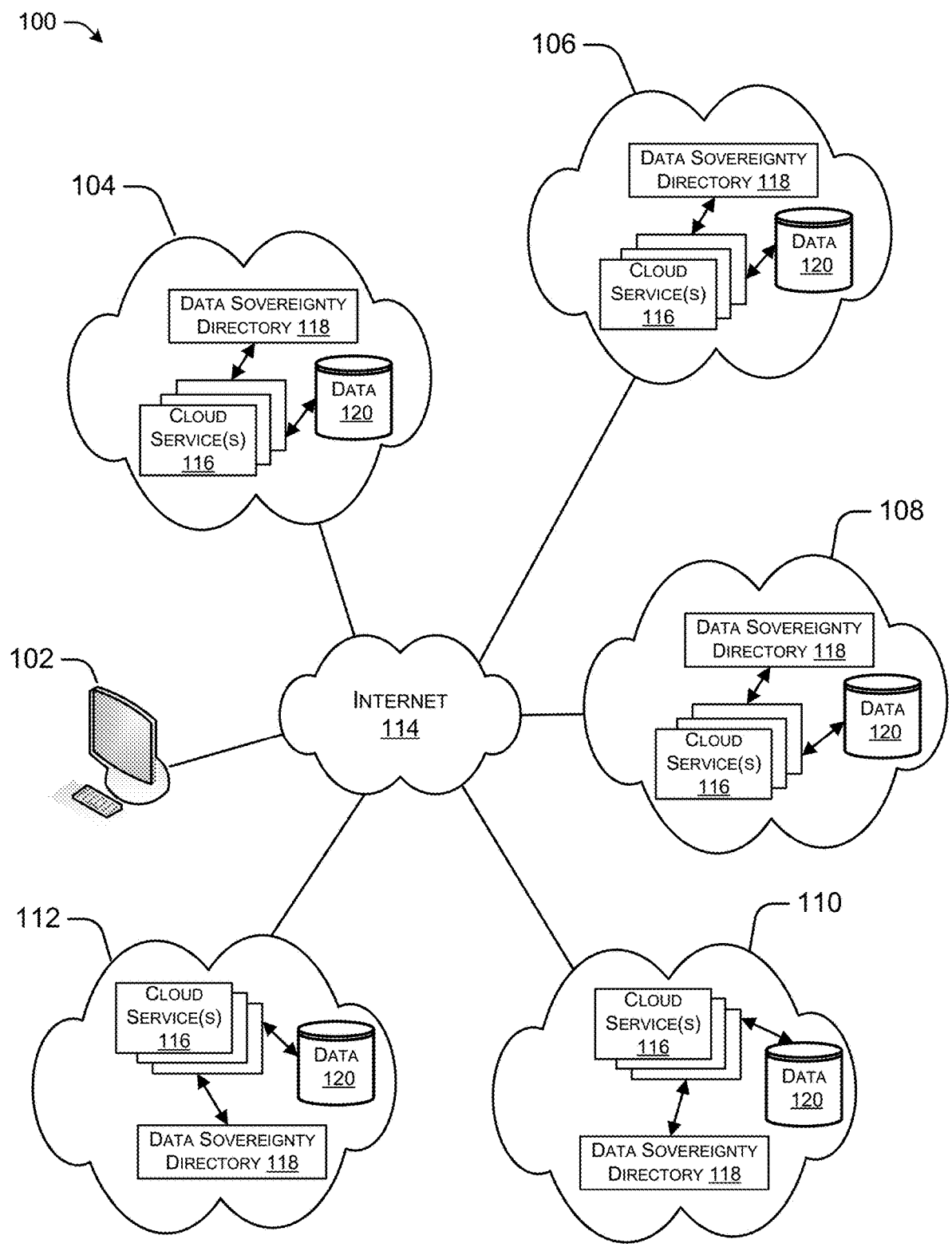
FIG. 1 illustrates a computing environment including a client device and a distributed network of datacenters configured to provide cloud services, in accordance one or more techniques described herein.

This disclosure describes techniques for providing services and other computing resources from a distributed network (e.g., a cloud computing network) to client devices that have data sovereignty requirements. The cloud computing network may include multiple geographically distributed datacenters, where each datacenter includes computer servers and/or datastores configured to provide various cloud services to client devices. Some client devices requesting access to the cloud services of the network may be associated with data sovereignty policies. For instance, a client device may be associated with a client (or customer) organization having a data sovereignty policy and/or requirements that specify the particular countries (or other geographic regions) from which the user or organization can access cloud services and/or transfer data. Data sovereignty policy requirements may be associated with client organizations, individual users, client devices, and/or access networks, and also may apply specifically to the particular cloud services configured to transmit or receive sensitive or confidential data.

Within the cloud computing network, data sovereignty requirements for various users, client organizations, etc., may be stored and propagated to the datacenters and/or servers within the network. When a server in a datacenter receives a service request from a client device, the server may initially determine whether it complies with the data sovereignty requirements of the client device. As discussed above, in distributed network architectures, the network may use routing techniques that route requests directly to the fastest and/or nearest datacenter to the client device, regardless of whether that datacenter complies with the data sovereignty policies of the client device. To determine whether or not it complies, the server that receives the request may identify the user, organization, and/or cloud service customer associated with the request, and may retrieve the associated data sovereignty requirements for the user, organization, and/or customer from a data sovereignty database or directory. The server may compare its own geographic location to the client's data sovereignty requirements to determine whether or not it is permitted to provide the requested cloud services to the client device. When the geographic location of the datacenter complies with the data sovereignty requirements, the server may proceed to provide the requested cloud services to the client device.

However, when the geographic location of the datacenter does not comply with the client's data sovereignty requirements, the server may be configured not to provide the requested cloud services to the client device. Instead, the server may determine and transmit back to the client device a set of alternative datacenters within the cloud computing network that comply with the client's data sovereignty requirements, and which are capable of providing the requested cloud services. For instance, the server within the datacenter may compare the data sovereignty requirements of the client device with a listing of the geographic locations of the other datacenters within the cloud computing network. The server may identify some or all of the other datacenters that comply with the client's data sovereignty requirements, and may transmit a set of identifiers and/or network addresses for the compliant datacenters back to the client device.

After receiving the set of other compliant datacenters from the server, the client device may transmit a network probe to each of the other datacenters to determine a preferred datacenter to provide the cloud services to the client device. In some examples, the client device may compare the round-trip times of the network probes and/or other performance metrics, to determine a fastest responding and/or geographically nearest alternative datacenter, from which the client device may receive the requested cloud services.

As illustrated in the various examples herein, the techniques in this disclosure improve network efficiency and performance of cloud service providers, while also assuring compliance with the various data sovereignty policies of the clients requesting cloud services. For example, the techniques described herein are compatible with Anycast, multicast, and other DNS-based routing techniques, and provide the advantages in service reliability, performance, server load balancing, etc., associated with these routing techniques. Additionally, the techniques described herein combine the determinations of data sovereignty compliance that are performed by the server and are unavailable to the client device, with the network probe evaluations performed by client that are unavailable to the server, thus operating in a coordinated technique to select a preferred or optimal alternative datacenter to provide the cloud services to the client device. Thus, these techniques assure that the datacenter selected to provide the cloud services complies with the applicable data sovereignty requirements of the client device, and provides improved performance of the cloud computing network for delivery of cloud services.

In some examples, after the client device selects an alternative datacenter to provide the requested cloud services, the client device may transmit an identifier of the selected datacenter back to the first datacenter that received the initial cloud service request. In such examples, the first datacenter may coordinate with the selected datacenter to facilitate the migration of the cloud service request to the selected datacenter. For instance, the first datacenter may transfer the session data and/or migrate the connection to the selected datacenter. The first datacenter also may transmit various client-specific and/or session-specific data associated with the client device, such as cloud service request data, authentication data, etc. These techniques thus provide additional advantages when migrating client connections to new datacenters that are compliant with the data sovereignty requirements of the client device, such as not requiring the client to reconnect and/or reauthorize at the new datacenter. Instead, client migrations between datacenters may be performed efficiently by the cloud computing network, and in some cases may be transparent to the client device. Thus, in these examples, the client device may make the initial connection with a first non-compliant datacenter, and after a second compliant datacenter is selected the first datacenter may move the connection over the second one. Therefore, the client device need not go through the a reauthentication or examination process with the second datacenter, as these processes have already been performed by the first datacenter.

Further, when a datacenter in the cloud computing network is engaged with a client device providing a cloud service, the techniques described herein also may be used to migrate the client device to a different datacenter in the event of a failover, network outage, scheduled maintenance on the datacenter, or for purposes of load balancing or performance optimization. In such cases, if a first datacenter providing cloud services to a client device determines that the client connection is to be migrated to a different datacenter, the first datacenter may use the techniques described above to determine a subset of the available datacenters in the network that are compliant with the data sovereignty requirements of the client device. The first datacenter may directly select a new datacenter that is compliant with the client's data sovereignty requirements, or may transmit a set of alternative compliant datacenters to the client device, which may evaluate the alternative datacenters using network probes and may select the new datacenter as described above.

In an example of the present disclosure, a method includes receiving, by a first server at a first location within a cloud computing network, a request from a client device to access a cloud service. The method in this example further includes receiving, by the first server, a data sovereignty requirement associated with the client device. The method also includes selecting, by the first server, a second server within the cloud computing network, based at least in part on a second location associated with the second server, and the data sovereignty requirement associated with the client device.

Additionally, the method includes transmitting, by the first server, a network address associated with the second server to the client device.

In another example of the present disclosure, a method includes transmitting, by a client device, a request to access a cloud-based service, using a first network address that is shared by multiple servers within a cloud computing network. This method in this example also includes receiving, by the client device, a response from a first server executing a first instance of the cloud-based service, the response including a second network address associated with a second server and a third network address associated with a third server. The method further includes transmitting, by the client device a first network probe to the second server using the second network address, and receiving a response to the first network probe, and transmitting, by the client device a second network probe to the third server using the third network address, and receiving a response to the second network probe. Additionally, the method includes selecting, by the client device, the second server based at least in part on the response to the first network probe and the response to the second network probe, and transmitting, by the client device and to the first server, data identifying the second server. Further, the method in this example includes receiving, by the client device, data from a second instance of the cloud-based service executing on the second server.

In yet another example of the present disclosure, computer server includes one or more processors, and one or more non-transitory computer-readable media storing instructions that, when executed by the one or more processors, cause the one or more processors to perform various operations. The operations in this example include receiving a request from a client device to access a cloud service, wherein the computer server is a first server within a cloud computing network. The operations further include receiving a data sovereignty requirement associated with the client device, and selecting a second server within the cloud computing network, based at least in part on a location associated with the second server, and the data sovereignty requirement associated with the client device. Additionally, the operations in this example include transmitting a network address associated with the second server to the client device.

Additionally, the techniques described in this disclosure may be implemented and performed as systems, methods, and/or computer-program products tangibly embodied in a non-transitory computer-readable storage medium, etc.

Example Embodiments

This disclosure describes techniques for providing software services and/or other computing resources from networks of geographically distributed servers in accordance with the data sovereignty requirements of client devices. In some examples, a distributed network may include a cloud computing network having a number of geographically distributed cloud datacenters, and each datacenter may include a number of servers configured to provide cloud services to client devices. For instance, a cloud computing network may provide various cloud services including but not limited to hosted websites and applications, virtual firewall and network security services, data storage and management tools, high-performance compute services, big data analytics, etc. Front-end client devices may connect to any datacenter within the cloud computing network to access the cloud services. Various embodiments described herein may be implemented via private clouds, public clouds, hybrid clouds, and multiclouds. Further, it should be understood that the techniques described herein are not limited to providing cloud services via cloud datacenters, but may apply to any network of multiple servers providing computing resources or services from different geographic locations.

FIG. 1 illustrates a computing environment 100 (e.g., cloud computing network) including a client device 102 and a distributed network of datacenters 104-112 in a cloud network configured to provide cloud services to client devices. Datacenters 104, 106, 108, 110, and 112 may operate at different physical geographic locations, each of which are within and accessible via the Internet 114. In this example, each datacenter 104-112 may be identically provisioned with a common set of cloud services 116, a data sovereignty directory 118, and a back-end data store 120 associated with the cloud services 116. However, in other examples, different datacenters 104-112 may provide different sets of cloud services 116 and/or may store different data within back-end data stores 120.

When a client device 102 makes a request that invokes a cloud service 116, a one-to-one-of-many routing protocol, such as Anycast or another dynamic routing protocol, may direct the request to a server within any of the datacenters 104-112 that configured to provide the cloud service 116 within the cloud computing network. For example, in Anycast routing, datacenters 104-112 may be associated with a shared destination address (e.g., a shared IP address), and the client device 102 may use the shared address to request the cloud services from the cloud network. Network routers implementing an Anycast delivery scheme may use DNS servers to determine an optimal (e.g., nearest or fastest responding) datacenter 104-112 within the cloud network, and may automatically route the request from the client device 102 to the selected datacenter. As noted above, such routing techniques provide advantages in performance, reliability and load balancing for the cloud network. However, when Anycast or other dynamic routing techniques are used, the client device 102 may be unable to select a particular datacenter 104-112 from which to request the cloud services, and might not have control or knowledge of the geographic location of the datacenter serving the request. Similarly, each datacenter 104-112 may be unaware and unable to control from which clients it may receive requests and where the requesting client device may be located. Accordingly, with conventional uses of Anycast and dynamic routing techniques, neither the datacenters 104-112 nor the client devices 102 may be capable of supporting data sovereignty requirements.

To address these deficiencies of cloud networks, each datacenter 104-112 in this example may store and implement the data sovereignty policies of the various clients of the cloud network. As used herein, the clients (or customers) of a cloud network may refer to individual users, organizations, governmental entities, etc., that are permitted to access various cloud services 116 and/or data 120 provided by the datacenters 104-112 of the cloud network. Clients may establish data sovereignty policies and associated requirements when registering for cloud services 116. For instance, a client (or customer) of the cloud network may register for a particular cloud service 116, and may specify that any requests from the client's users and/or devices (e.g., client device 102) must access the cloud service 116 via datacenters 104-112 that are physically located within a particular country or set of countries.

As noted above, datacenters 104-112 may operate at different geographic locations. Each datacenter 104-112 may store data sovereignty policies and/or requirements within a local data sovereignty directory 118 that includes the data sovereignty requirements associated with different clients of the cloud computing network. In some examples, the data sovereignty requirements stored the data sovereignty directory 118 of each datacenter are replicated and/or propagated to the other datacenters 104-112, including new data sovereignty requirements and modifications to or removals of existing data sovereignty requirements associated with the clients of the cloud network. When a cloud service request is received from a client device 102 at a particular datacenter (e.g., datacenter 104), the datacenter 104 may determine the client associated with the request and may retrieve the data sovereignty requirements associated with the client from the data sovereignty directory 118. In various examples, the datacenter 104 may use the source IP address of the cloud service request, a network or device identifier associated with the request or the client device 102, and/or authentication credentials provided with the request, to determine the individual user, customer, or other organization associated with the request from the client device 102. After identifying the applicable client and retrieving the data sovereignty requirements associated with the client, the datacenter 104 may compare its own geographic location to the data sovereignty requirements to determine if it is permitted to provide the requested cloud services to the client device 102.

If the datacenter 104 that receives the cloud service request from the client device 102 determines that it complies with the data sovereignty requirements of the client, the datacenter 104 may provide the cloud services 106 to the client device 102 as requested. Otherwise, as described in more detail below, the datacenter 104 may identify one or more of the other datacenters 106-112 in the cloud computing network that complies with the client's data sovereignty requirements. For instance, each datacenter 104-112 may include within the data sovereignty directory 118 (or other storage) a listing of the geographic locations all datacenters 104-112 in the network. Such listings may include GPS coordinates, country identifiers, state/province identifiers, and/or other location data for each datacenter 104-112 in the network. The datacenter 104 may compare the datacenter locations to the client's data sovereignty requirements, to determine which of the other datacenters 106-112 in the network are capable of providing the cloud services to the client device 102 in compliance with the client's data sovereignty requirements.

After identifying one or more other datacenters 106-112 in the network that comply with the client's data sovereignty requirements, the datacenter 104 may transmit network addresses and/or other identifiers of the compliant datacenters back to the client device 102. The client device 102 may use network probes to evaluate the other compliant datacenters, and to select a nearest and/or fastest responding of the datacenters from which to request the cloud services. The datacenter 104 may coordinate with the selected new datacenter to move/redirect the cloud service request from the client device 102 to the new datacenter. In various examples, moving the client's cloud service request may include transferring an established network session and migrating the connection with the client device 102, and/or transferring the cloud service request and various client-specific data, authentication credentials, and the like.

In some example, the routing protocol and/or delivery scheme in operation (e.g., Anycast) may route the request from the client device 102 to a first datacenter 104, but also may identify one or more of the other datacenters 106-112 in the network as potential alternate datacenters that are geographically or topologically nearest to the client device 102 and/or to the first datacenter 104. Additionally, as described above the first datacenter 104 that receives the request from the client device 102 may respond back to the client device 102 with a message identifying multiple potential alternate datacenters that comply with the client's data sovereignty requirements. However, in other cases the first datacenter 104 may directly select an alternative datacenter that complies with the client's data sovereignty requirements, without using network probe results or any other data from the client device 202. Such cases may allow the first datacenter 104 to more quickly initiate the migration of the request to the alternative datacenter. As an example, the first datacenter 104 may use the datacenter locations to select as the alternative datacenter the datacenter that is geographically nearest to the first datacenter 104, and that complies with the client's data sovereignty requirements. Additionally or alternatively, the datacenter 104 may determine a geographic location of the client device 102, for instance, using a source IP address, access network, and/or network path data added to the request, etc., and may select the alternative datacenter that is geographically nearest to the client device 102. As another example, when the datacenter 104 determines that there is only one alternative datacenter in the cloud network that is capable of providing the requested cloud services, and that complies with the client's data sovereignty requirements, the datacenter 104 may select that alternative datacenter and directly commence to migrate the client's request to the alternative datacenter, without needing to provide a network address or other datacenter identifier to the client device 102 for network path or performance evaluation.

Figure 2:
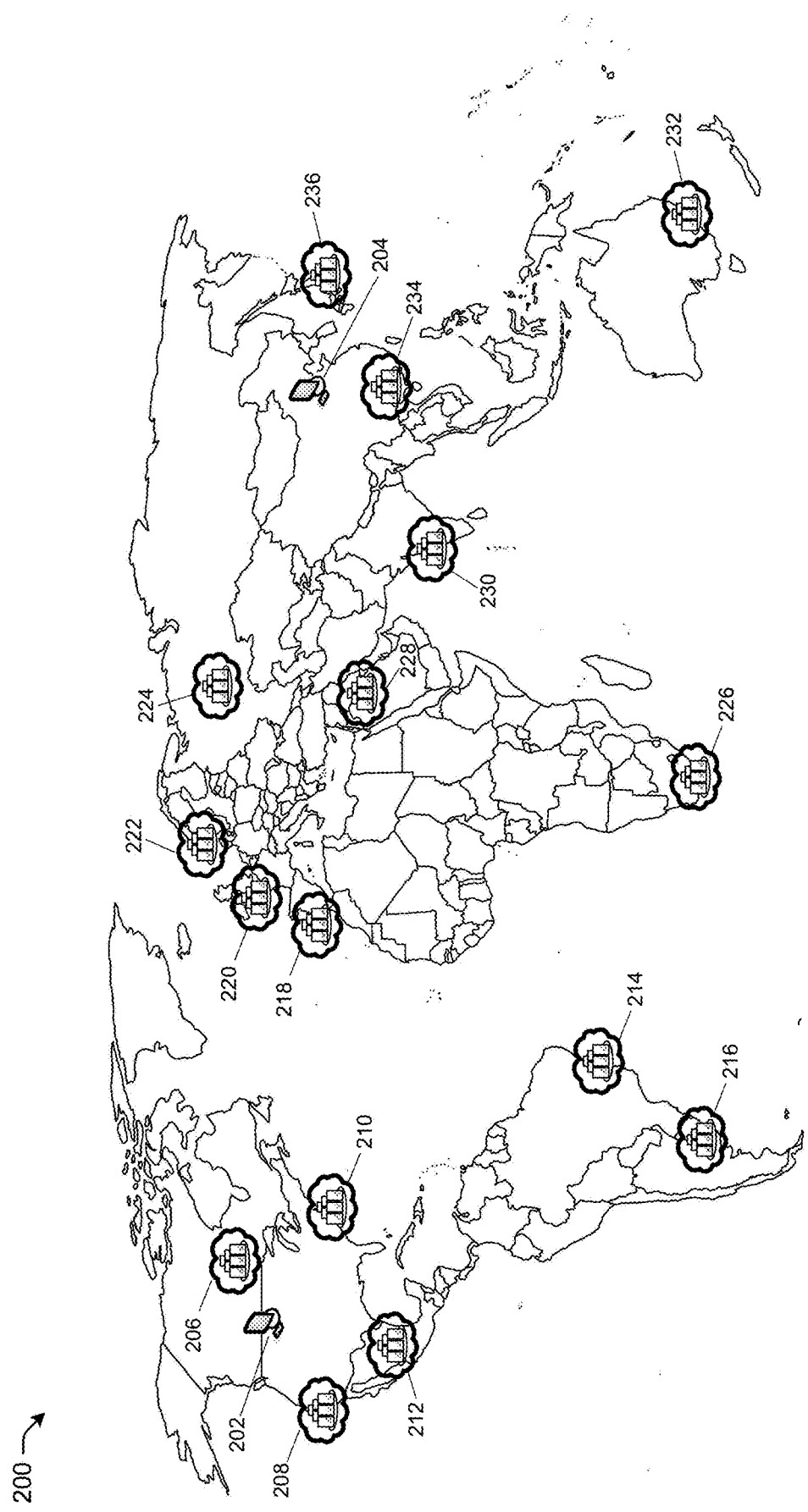
FIG. 2 illustrates a global distributed network of datacenters configured to provide cloud services, in accordance one or more techniques described herein.

FIG. 2 shows a global distributed computer network 200, including two example client devices 202 and 204, and sixteen different datacenters 206-236 configured to provide computing services and/or resources to client devices. In some examples, the distributed computer network 200 may be a cloud network similar or identical to the cloud computing network 100 described above in FIG. 1, in which client devices 202 and 204 may correspond to the client device 102, and datacenters 206-236 may be similar or identical to the datacenters 104-112. However, FIG. 2 depicts additional datacenters and a simplified world map showing country borders, to illustrate a number of specific examples of selecting selection based on client data sovereignty policies.

In this example, client device 202 is located in the northern continental United States. When the client device 202 transmits a request for cloud services, the network routing protocol (e.g., Anycast) may attempt to identify a closest and/or fastest responding datacenter to service the request. In this example, the request may be routed to datacenter 206, which may be the closest datacenter to the client device 202, and is located in southern Canada. However, in this example, the client (or customer) associated with the request has a data sovereignty policy that requires all cloud services of the particular type requested to be provided by datacenters operating in the United States. Therefore, after receiving the request, datacenter 206 may compare its location to the data sovereignty requirements of the client and determine that it is not permitted to service the request. The datacenter 206 also compares the client's data sovereignty requirements to the locations of the other datacenters 208-236 in the network, and identifies datacenter 208 and datacenters 210 as potential alternative datacenters that comply with the client's data sovereignty requirements.

The datacenter 206 then may transmit data identifying the datacenters 208 and 210 (e.g., direct network addresses) to the client device 202, which may use network probes and/or other techniques to evaluate datacenters 208 and 210 and select the closest and/or fastest responding alternative datacenter. In this case, the client device 202 may select datacenter 208 as the alternative datacenter, and may transmit an identifier for the selected datacenter 208 back to first datacenter 206. Datacenter 206 then may migrate the service request to the selected datacenter 208 as described above, thereby assuring that cloud services are provided to the client device 202 via a highly performant datacenter that also complies with the client's data sovereignty requirements.

To illustrate another example shown in FIG. 2, client device 204 is located in northern China. When the client device 204 transmits a request for cloud services, the network routing protocol (e.g., Anycast) may attempt to identify a closest and/or fastest responding datacenter to service the request. In this example, the request may be routed to datacenter 234, which is located is southern China. However, in this example, the client (or customer) associated with the request has a data sovereignty policy that requires all cloud services of the particular type requested to be provided by datacenters operating either in the European Union, Japan, or the United States. Therefore, after receiving the request, datacenter 234 may initially determine that it is not permitted to service the request, and then may compare the client's data sovereignty requirements to the locations of the other datacenters in the network to determine potential alternative datacenters to service the request. In this example, the datacenter 234 may determine that US-based datacenters 208 and 210, EU datacenters 218-222, and Japan-based datacenter 236 are compliant with the client's data sovereignty requirements. Datacenter 234 may transmit a listing of the potential alternative datacenters back to the client device 204, which may use network probes and/or other techniques to determine the nearest or fastest responding alternative datacenter. In this case, client device 204 may determine that Japan-based datacenter 236 is the nearest (or fastest responding) alternative datacenter, and may transmit data identifying datacenter 236 back to datacenter 234. Datacenter 234 then may migrate the service request to the selected datacenter 236 as described above, thereby assuring that cloud services are provided to the client device 204 via a highly performant datacenter that also complies with the client's data sovereignty requirements.

Although the above examples describe data sovereignty requirements that specify a listing of countries from which particular clients (or customers) can access cloud services, in other examples data sovereignty requirements may be more detailed and granular with respect to the client requests, users, services/data, and/or geographic regions. For instance, data sovereignty requirements need not apply uniformly to all requests associated with a customer, but in some cases may be user-specific, device-specific, and/or access-network specific. As an example, one set of data sovereignty requirements may be applied to requests from some employees/users within a customer organization (e.g., based on the user's login credentials), while another set of data sovereignty requirements are applied to requests from other employees/users within the customer organization. In other examples, different sets of data sovereignty requirements may be applied to requests depending on the particular client device 202, geographic region, and/or access network from which the request was received. Additionally, the servers and datacenters within a distributed network may apply multiple different data sovereignty requirements for the same client, depending on the particular cloud service(s) requested and/or based on the particular types of data (e.g., confidential or sensitive data) to be transmitted or received by the service. For instance, a datacenter may one set of data sovereignty requirements for a client when a client device 102 accesses a cloud service 116 that transmits and receives confidential financial data, and a different set of data sovereignty requirements for the same client when the client device 102 accesses a different cloud service 116 that transmits and receives confidential patient health data, and so on. Further, although the above examples refer to country-specific data sovereignty requirements, any or all of the data sovereignty requirements described herein can be applied by the datacenters to continents, countries, states or provinces, counties, cities, or any other jurisdiction region and/or geographic area defined by GPS coordinates.

Figure 3:
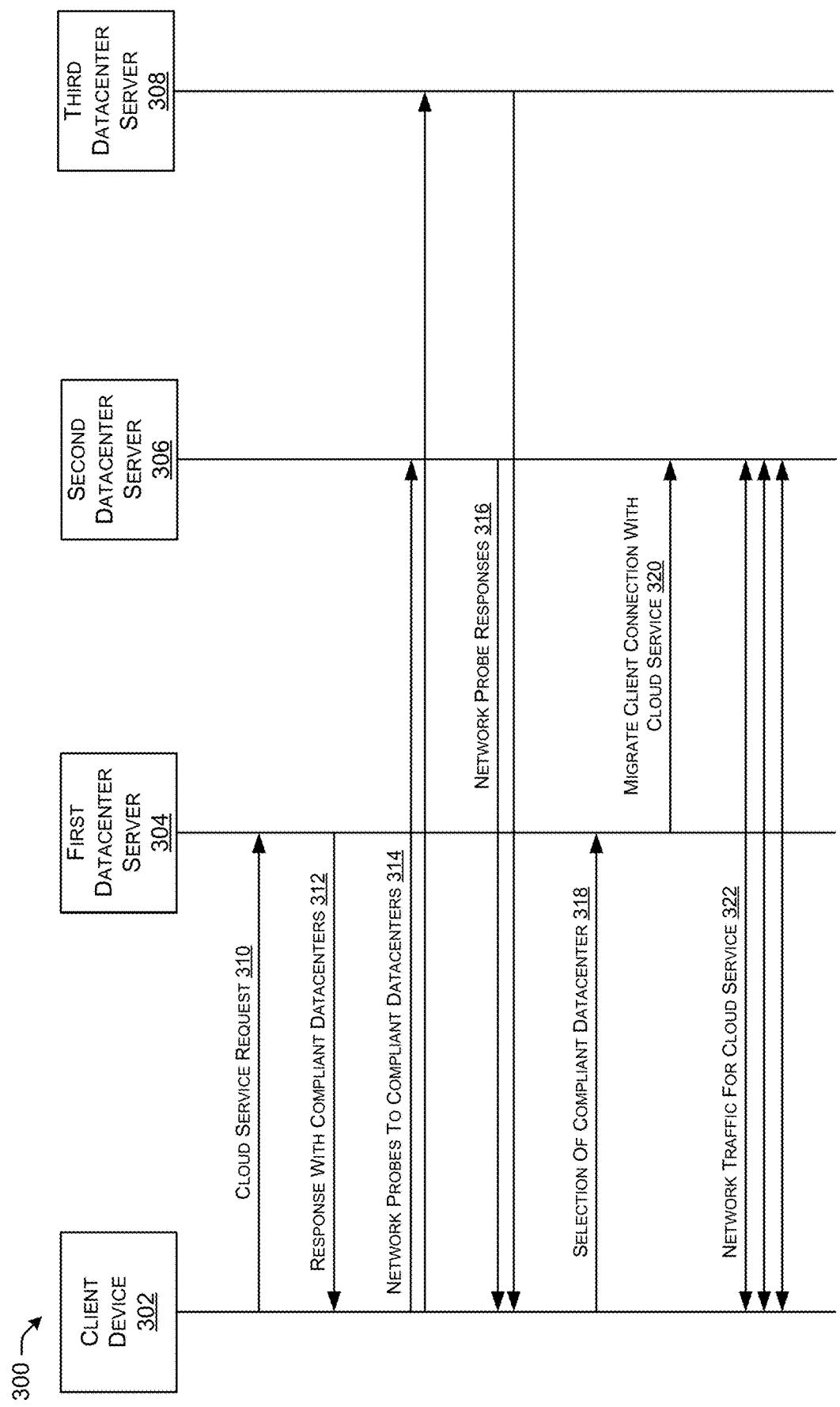
FIG. 3 illustrates example communication flows between a client device and multiple datacenters configured to provide cloud services, in accordance one or more techniques described herein.

FIG. 3 is a diagram 300 depicting the communication flows between a client device 302 and three datacenters 304, 306, and 308 within a distributed network configured to provide services and other computing resources. Diagram 300 schematically illustrates an example of the techniques described above for selecting a datacenter to provide cloud services based on a data sovereignty policy of the client device. The client device 302 and datacenters 304-308 in this example may be similar or identical to any or all of the respective client devices and datacenters described above in FIGS. 1-2. Accordingly, in this example datacenters 304-308 may operate at separate geographic locations in a cloud computing network, where each datacenters 304-308 may support a common set of cloud services 116 and/or provide access to the same data 120, and where a routing protocol such as Anycast or another one-to-one-of many routing technique is used to route service requests from client devices to datacenters.

At communication 310, the client device 302 transmits a request for cloud services that is received by datacenter 304. In Anycast and similar routing schemes, the client device 302 may transmit the request using a shared destination network address (e.g., a shared IP) associated with all datacenters (or a subset of multiple datacenters) in the cloud network. Using DNS services, the network routers determine an optimal datacenter, which may be based on the closest distance, fastest response, shortest number of hops, etc., and route the request to the determined datacenter. In this example, the routing methodology implemented by the network has determined that datacenter 304 is the closest (or otherwise preferred) datacenter to service the request from client device 302.

At communication 312, the datacenter 304 transmits a response back to the client device 302. In this example, datacenter 304 has determined the client (or customer) associated with the service request. retrieved the data sovereignty policies associated with the client, and determined that it is not permitted to provide the requested cloud service(s) to the client device 302. Therefore, as described above, datacenter 304 determines and transmits back to the client device 302 an indication that it cannot provide the requested cloud services, along with data (e.g., datacenter names, geographic locations, and/or direct network addresses) for two alternative datacenters 306 and 308 that comply with the data sovereignty policies associated with the client, and thus are permitted to provide the requested cloud service(s) to the client device 302.

At communication 314, the client device 302 transmits network probes to each of the alternative datacenters 306 and 308 identified by the datacenter 304 as complying with the data sovereignty policies. At communication 316, the client device 302 receives responses from the network probes transmitted in communication 314. The client device 302 may evaluate the responses network probes using one or more performance metrics. For example, the client device 302 may compare the round-trip times (RTTs) of the network probes to each alternative datacenter 306-308, the number of hops, the geographic distance, the network costs, latency, and/or network congestion levels.

At communication 318, the client device 302 transmits a selected alternative datacenter to the datacenter 304 to which the service request was initially routed. The alternative datacenter may be selected by the client device 302, based on the evaluation of the network probe responses received in communication 316. In this example, the client device 302 has determined that datacenter 306 is preferred as an alternative datacenter, rather than datacenter 308, to provide the requested cloud services. At communication 320, datacenter 304 initiates a communication with the selected alternative datacenter 306 to migrate the cloud service request of the client device 302, from the initial datacenter 304 to the selected alternative datacenter 306. As described above, in various examples communication 320 may include the datacenter 304 migrating a connection (e.g., a previously created VPN tunnel) established for the client device 302 to the alternative datacenter 306. Additionally or alternatively, the datacenter 304 may transmit session data, authentication credentials, request data, or other client-specific data to the alternative datacenter 306.

Then, at communication(s) 322, the requested cloud service(s) are provided by the alternative datacenter 306 to the client device 302. As noted above, while providing the cloud service(s), the datacenter 306 and the client device 302 may exchange data associated with the cloud service(s). In some cases, the data exchange during cloud service sessions may include confidential and/or sensitive data which may be subject to the data sovereignty requirements, including but not limited to personal data, financial data, governmental data, secure data, healthcare records, etc. Therefore, as illustrates by diagram 300, the client device 302 initially may transmit/receive data with a datacenter 304 that does not comply with the client's data sovereignty requirements. The data initially exchanged with the non-complying datacenter 304 may include requests for cloud services, authentication data, user credentials, etc. However, in this example, the datacenter 304 prevents exchange of any data which may be subject to the client's data sovereignty requirements, until after the connection with the client device 302 has been moved to the alternative datacenter 306 that complies with the client's data sovereignty requirements.

Figure 4:
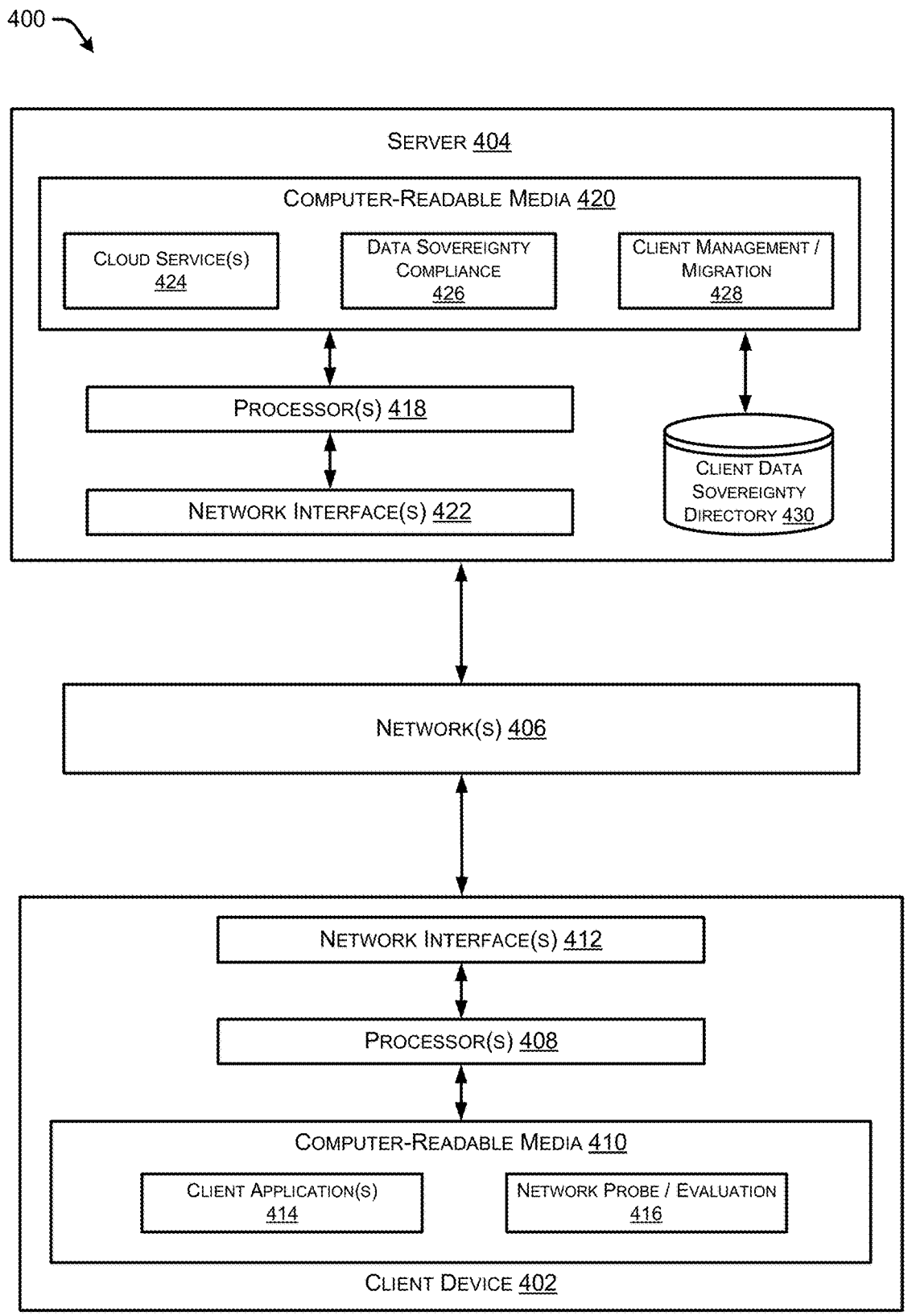
FIG. 4 illustrates a computer architecture diagram including various components of a client device and a computer server within a datacenter, in accordance one or more techniques described herein.

FIG. 4 is a block diagram illustrating a system 400 including various components for selecting datacenters to provide cloud services to client devices, in compliance with client data sovereignty requirements, according to various implementations described herein. System 400 includes a client device 402 coupled to a server 404, via a network 406. The client device 402 may correspond to any of the client devices described in the above examples. Additionally, the server 404 may represent a computer server of any of the datacenters described in the above examples, in which the server 404 is configured to execute an instance of one or more cloud service 116 and/or store cloud data 120. Network 406 may include one or more wired or wireless communication networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets.

As illustrated, the client device 402 may include one or more hardware processor(s) 408 configured to execute one or more instructions stored on computer-readable memory 410. The processor(s) 408 may comprise one or more cores. Further, the client device 402 may include one or more network interfaces 412 configured to provide communications between the client device 402 and other devices, such as the datacenter server(s) 404. The network interface(s) 412 may include devices configured to couple to personal area networks (PANs), wired and wireless local area networks (LANs), wired and wireless wide area networks (WANs), and so forth. For example, the network interfaces 412 may include devices compatible with the wired and/or wireless communication technologies and protocols described herein.

The client device 402 may also include computer-readable media 410 that stores various executable components (e.g., software-based components, firmware-based components, etc.). In addition to various components discussed herein, the computer-readable media 410 may further store components to implement functionality described herein. While not illustrated, the computer-readable media 410 may store one or more operating systems utilized to control the operation of the one or more devices that comprise the client device 402. According to one example, the operating system comprises the LINUX operating system. According to another example, the operating system(s) comprise the WINDOWS SERVER operating system from MICROSOFT Corporation of Redmond, Wash. According to further examples, the operating system(s) may comprise the UNIX operating system or one of its variants. It may be appreciated that other operating systems may also be utilized.

In this example, the computer-readable memory 410 of the client device 402 may include one or more client applications 414 configured to access the cloud services provided by the server(s) 404 of the cloud network. For instance, client applications 414 configured to execute on the client device 402 to access cloud services may include one or more web browsers, mobile applications, thin clients, and/or emulators. Additionally, computer-readable memory 410 of the client device 402 may store a network probe and evaluation component 416, configured to perform the techniques described above for transmitting network probes to potential alternative datacenters, and selecting a preferred or optimal datacenter from which to receive the cloud services, based on the evaluation of the probe responses.

As depicted in this example, the server 404 also may include one or more hardware processor(s) 418 configured to execute stored instructions in a computer-readable media 420. The processor(s) 418 may comprise one or more cores. Further, the server 404 may include one or more network interfaces 422 configured to provide communications between the server 404 and other devices, such as client device(s) 402. The network interface(s) 422 may include devices configured to couple to personal area networks (PANs), wired and wireless local area networks (LANs), wired and wireless wide area networks (WANs), and so forth. For example, the network interfaces 422 may include devices compatible with the wired and/or wireless communication technologies and protocols described herein.

The computer-readable media 420 of the server 404 may stores various executable components (e.g., software-based components, firmware-based components, etc.). In addition to various components discussed herein, the computer-readable media 420 may further store components to implement functionality described herein. While not illustrated, the computer-readable media 420 may store one or more operating systems utilized to control the operation of the one or more devices that comprise the server 404. In some examples, the operating system comprises the LINUX operating system. In other examples, the operating system(s) comprise the WINDOWS SERVER operating system from MICROSOFT Corporation of Redmond, Wash. According to further examples, the operating system(s) may comprise the UNIX operating system or one of its variants. It may be appreciated that other operating systems may also be utilized.

The computer-readable media 420 of the server 404 also may store one or more executable cloud services 424, which may include any or all of the cloud services 116 describe above. For instance, cloud services 424 may correspond to website hosting and application services, virtual firewall services, security services, data storage and access services, etc. The computer-readable media 420 also stores a data sovereignty compliance component 426 and a client management and migration component 428. The data sovereignty compliance component 426 may perform the techniques described above by which the server 404 determines whether or not it is permitted to handle a cloud service request from a client device 202. For instance, the data sovereignty compliance component 426 may retrieve the data sovereignty requirements associated with the client and/or request, from the client data sovereignty database 430, and compare the requirements to its own geographic location to determine whether or not the server 404 is permitted to handle the request. If the server 404 is not permitted to handle the request, the data sovereignty compliance component 426 also may retrieve the geographic locations of other alternative datacenters (e.g., from the client data sovereignty database 430 and/or other storage), and compare the locations to the client's data sovereignty requirements to determine a set of alternative datacenters that are permitted to provide the cloud services client's data sovereignty requirements. The client management and migration component 428 may perform the techniques described above by which the server 404 migrates a client connection associated with a cloud service request to a different server within a different datacenter.

As noted above, the client data sovereignty database 430 may store the data sovereignty requirements associated with any and all clients or customers of the cloud network. In some examples, the client data sovereignty database 430 may be replicated and/or propagated between servers of the different datacenters within the cloud network, including any modifications to client data sovereignty policies or requirements.

Figure 5:
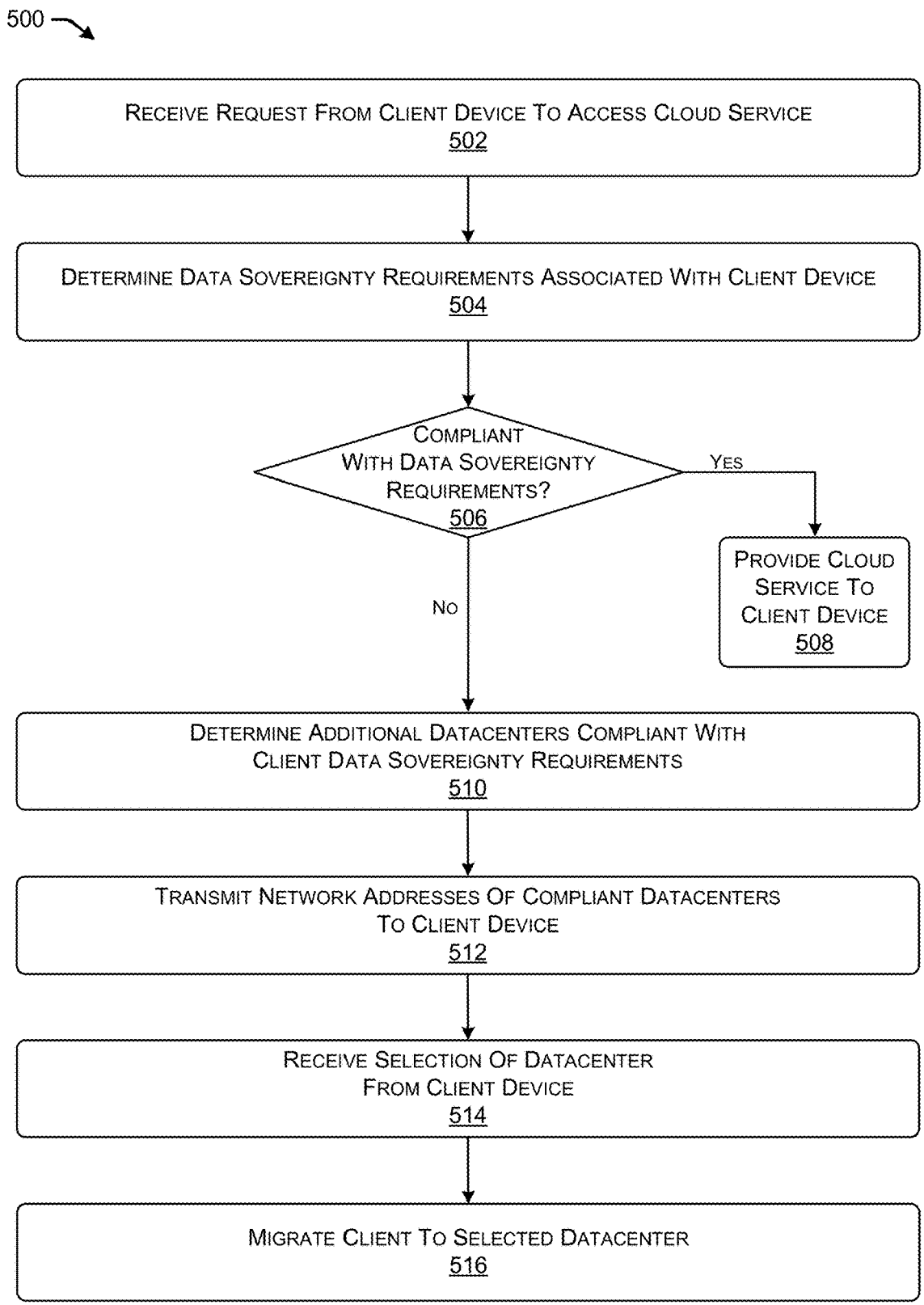
FIG. 5 illustrates a process by which a server may handle a request for cloud services based on data sovereignty requirements associated with the client device, in accordance with one or more techniques described herein.

FIG. 5 illustrates a flow diagram of an example process 500 of receiving and processing requests from client devices for cloud services by a server in a cloud network datacenter, in accordance with various techniques described herein. As describe above, the datacenters (and the servers within datacenters) of a cloud network may receive requests based on routing techniques such as Anycast, in which the datacenter that initially receives the request from the client may or may be compliant with the data sovereignty requirements of the client. Accordingly, example process 500 describes techniques in which a datacenter server determines whether or not it is permitted to handle a request for cloud services received from a client device, and if not, the server determines alternative servers/datacenters to handle to request. As described below, the operations of process 500 may be performed by a server 404 in response to receiving a request for cloud services from a client device 402. However, it should be understood that the operations described in reference to process 500 may be performed by any of the servers, computing devices, and/or components thereof that are described herein.

At operation 502, the server 404 receives a request to access one or more cloud services (e.g., cloud services 116) from a client device 402. The server 404 may be a server operating within a datacenter of a cloud network having multiple geographically distributed datacenters. Additionally, the request may be received by the server 404 based on the routing technique used, such as Anycast or other DNS-based routing, in which the server 404 was selected as the preferred (e.g., closest) datacenter in the cloud network to the client device 402 that is configured to provide the requested services. In some instances, the client device 402 may transmit the request in operation 502 to a shared IP destination address that is used by multiple (or all) datacenters within the cloud network. Although the request in operation 502 is a request to execute cloud services 116, in other examples the request may be a request to transmit or receive data or other computing resources from a datacenter in the cloud network.

At operation 504, the server 404 determine the data sovereignty requirements associated with the request. As noted above, data sovereignty policies may be defined by client (or customer organizations) when registering for cloud services. The corresponding data sovereignty requirements based on the policies may be based on the client, the particular user and/or particular client device 402, the requested cloud service, and/or various other factors (e.g., the date, time, client location, etc.). In some examples, data sovereignty requirements for various clients (or customers) may be stored within the server 404 in a client data sovereignty database 430. Additionally or alternatively, the server 404 retrieve the client's data sovereignty requirements from an external storage system within the datacenter, elsewhere in the cloud network, and/or from the client device 402 itself. In some examples, client devices 402 may embed or otherwise transmit their associated data sovereignty requirements within the cloud service request of operation 502.

At operation 506, the server 404 determines whether or not it complies with the client's data sovereignty requirements. In some examples, the server 404 may compare its own geographic location (e.g., country, state/province, county/city, etc.) to the appropriate data sovereignty requirements for the client with respect to the requested cloud services. As noted above, the current geographic location of the client device 402 may be irrelevant to the determination in some cases. However, in other cases, data sovereignty requirements may be based on compatible location combinations between the server 404 and client device 402, and in such cases the determination in operation 506 may be based on client data sovereignty requirements, the location of the server 404, and the location of the client device 402.

When the server 404 determines that it can handle the cloud service request from the client device 402 in compliance with the client's data sovereignty requirements (506: Yes), then at operation 508 the server 404 may provide the cloud service request to the client device 402 as in normal operations.

However, if the server 404 determines that it cannot handle of the cloud service request from the client device 402 in compliance with the client's data sovereignty requirements (506: No), then at operation 510 the server 404 determines a set of additional datacenters within the cloud network that can handle the cloud service request. To determine the set of additional datacenters, the server 404 may retrieve a listing of the locations of the other datacenters in the cloud network, and may compare the other datacenter locations to the data sovereignty requirements from operation 504. In various examples, the server 404 may further analyze the set of other datacenters that are compliant with the client's data sovereignty requirements, to determine that the datacenters are capable of providing the requested cloud services 116. In some instances, the server 404 also may trim the set of compliant alternative datacenters to remove datacenters that are offline, have scheduled maintenance upcoming, or are greater than a threshold distance away. Additionally or alternatively, the server 404 may filter or prioritize the set of alternative datacenters based on additional criteria such as current client load, network traffic, performance metrics, etc.

At operation 512, the server 404 may transmit to the client device 402 the set of additional alternative datacenters that are compliant with the client's data sovereignty requirements. In some examples, the server 404 may provide the direct network addresses (e.g., IP addresses) for the alternative datacenters, in contrast to the shared destination IP address that is associated with the cloud network as a whole.

At operation 514, the server 404 receives a selection from the client device 402 identifying one of the additional alternative datacenters, from the set transmitted to the client device 402 in operation 512. As described below, the client device 402 may use network probes and/or other techniques to evaluate the alternative datacenters and select one to provide the requested cloud services. At operation 514, the server 404 receives the selected datacenter from the client device 402, and at operation 516, the server 404 initiates one or more processes to migrate the connection with the client device 402 from the server 404 to the selected alternative datacenter. Such migration processes may include migrating a connection (e.g., a previously created VPN tunnel) with the client device 402 to the selected datacenter, as well as transmitting session data, authentication credentials, client request data, and/or other client-specific data. Thus, the techniques illustrated by this example assure that the cloud network provides the requested cloud services to the client device 402, from a high performing datacenter (e.g., closest, fastest responding, fewest hops, etc.) that also complies with the data sovereignty requirements of the client.

As discussed above, operations 512 and 514 may be optional in some implementations. For instance, in some examples the server 404 may select a single alternative datacenter that is compliant with the client's data sovereignty requirements, and may directly initiate the migration processes in operation 516 without any further communication with the client device 402. In such examples, the server may select the alternative datacenter based on comparisons of one or more criteria, including distance between the datacenter and the server 404, distance between the datacenter and the client device 402, the current operational status of the datacenter, the performance metrics and network traffic associated with the datacenter, etc.

In still other implementations, the server 404 may perform operations 510 and 512 as described above, but operations 514 and 516 may be optional. For instance, the server 404 may determine and transmit a list of alternative datacenters to the client device 402 that are compliant with the client's data sovereignty requirements, as described above. However, in this example the server 404 then may rely on the client device 402 to select a new datacenter from the list of alternative datacenters, and to establish a connection with the new datacenter rather than migrating an existing connection/session from the server 404. However, as discussed above, additional improvements in cloud network performance and efficiency may be obtained by migrating the existing connection from the server 404.

Figure 6:
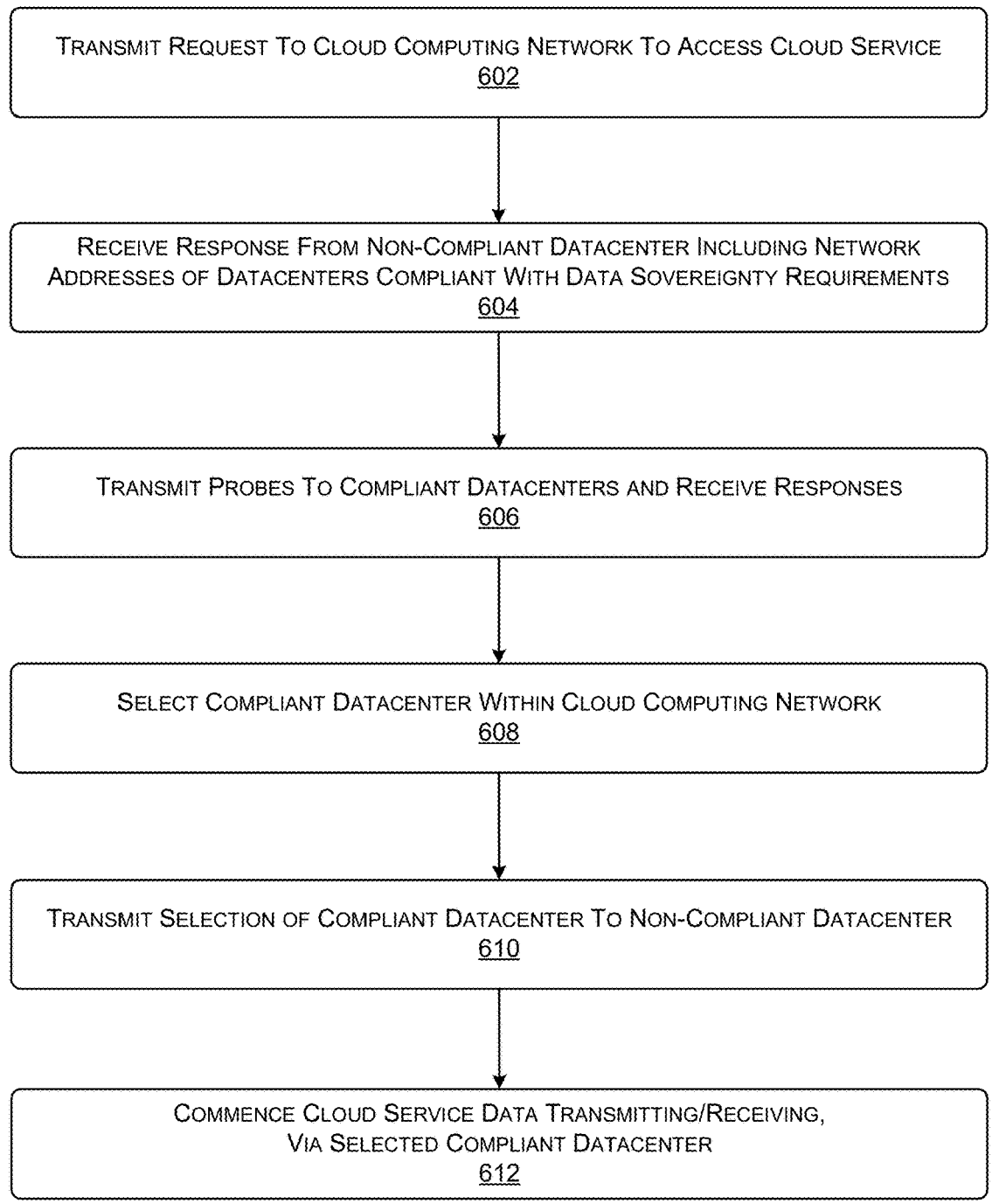
FIG. 6 illustrates a process by which a client device having associated data sovereignty requirements may request cloud services from a distributed network, in accordance with one or more techniques described herein.

FIG. 6 illustrates a flow diagram of an example process 600 of requesting cloud services by a client device from a cloud network having one or more datacenters, in accordance with various techniques described herein. As in the above examples, cloud service requests transmitted by the client device may be routed within the network using Anycast or other similar routing techniques, so that the requests may be received by datacenters that may or may be compliant with the data sovereignty requirements of the client. Accordingly, example process 600 describes techniques in which a client device, acting in conjunction with the datacenter that receives the initial cloud request, selects a datacenter that both highly performant and compliant with the client's data sovereignty requirements. As described below, the operations of process 600 may be performed by a client device 402, and may include communications with one or more servers 404 within cloud network datacenters. However, it should be understood that the operations described in reference to process 600 may be performed by any of the computing devices and/or components thereof described herein.

At operation 602, the client device 402 transmits a request to a cloud computing network to access one or more cloud services 116 and/or data 120 provided by the network. As in the above example, the cloud computing network in this case may have multiple geographically distributed datacenters, each operating one or more servers 404 to receive requests and provide cloud services to client devices 402. Additionally, the request transmitted by the client device 402 may use a shared IP address associated with the cloud network rather than being directed to any particular datacenter or server. The request may be routed, using Anycast or other similar routing techniques, to a server 404 that was selected as the preferred (e.g., closest) datacenter to the client device 402.

At operation 604, the client device 402 receives a response from the server 404 that received the cloud service request in operation 602. As discussed above, due to the routing schemes used in some implementations, the initial request may be received by a datacenter that may or may not be compliant with the client's data sovereignty policies. In this example, the server 404 that received the initial cloud service request from the client device 402 does not comply with the data sovereignty policies of the client. As a result, the response received at operation 604 includes a set of network addresses for alternative datacenters within the cloud network that comply with the client's data sovereignty policies, and which are capable of providing the requested cloud services.

At operation 606, the client device 402 transmits network probes to each of the network addresses for the alternative datacenters received in operation 604, and receives responses to the probes from the alternative datacenters. In contrast to the request in operation 602, the network probes in operation 606 may be transmitted to the direct network addresses for the alternative datacenters, rather than the shared destination IP address associated with the cloud computing network.

At operation 608, the client device 402 evaluates the responses to the network probes received in operation 606, and selects one of the alternative datacenters to provide the requested cloud services. In various implementations, the client device 402 may compare the probe responses based on one or more performance metrics, such as minimizing the round-trip times (RTTs) of the probe, minimizing the number of hops, minimizing the geographic distance between the datacenter and the client device 402, minimizing the network costs of communications with the datacenter, minimizing datacenter latency, and/or minimizing network traffic or congestion levels. In some cases, the evaluation techniques employed by the client device 402 may depend on the particular cloud services requested, and/or based on an anticipated session length and anticipated amounts of data to be transmitted to/received from the cloud service. For instance, if the client device 402 anticipates a short by time-critical cloud service session, it may weight criteria such as minimizing RTTs and network hops over criteria such as network costs. In contrast, if the client device 402 anticipates longer cloud service session with large data transfers, it may weight different criteria such as network costs and minimizing network traffic or congestion.

At operation 610, the client device 402 may transmit data identifying the datacenter selected based on the evaluation in operation 608, to the server 404 that received the initial request in operation 602. As discussed above, the server 404 may execute one or more migration processes to migrate the connection with the client device 402 from the server 404 to the new datacenter, thereby providing a seamless continuation of the cloud service request without requiring the client device to re-request, re-connect, re-authenticate, etc.

At operation 612, the client device 402 commences data transmitting/receiving with the requested cloud service. The cloud service communication in operation 612 is not performed between the client device 402 and the server 404, but instead between the client device 402 and the newly selected datacenter that complies with the client's data sovereignty requirements. Thus, in this example the client device 402 may initially communicate with non-compliant servers 404 in the cloud network (e.g., datacenters that does not comply with the client's data sovereignty requirements) to initiate requests for cloud services, perform authentication, provide user credentials, etc. However, the techniques described in this example prevent transmissions of cloud service data (e.g., personal data, financial data, healthcare records, governmental data, etc.) that is subject to the client's data sovereignty requirements, until the connection with the client device 402 has been migrated to a new datacenter that complies with the client's data sovereignty requirements.

Figure 7:
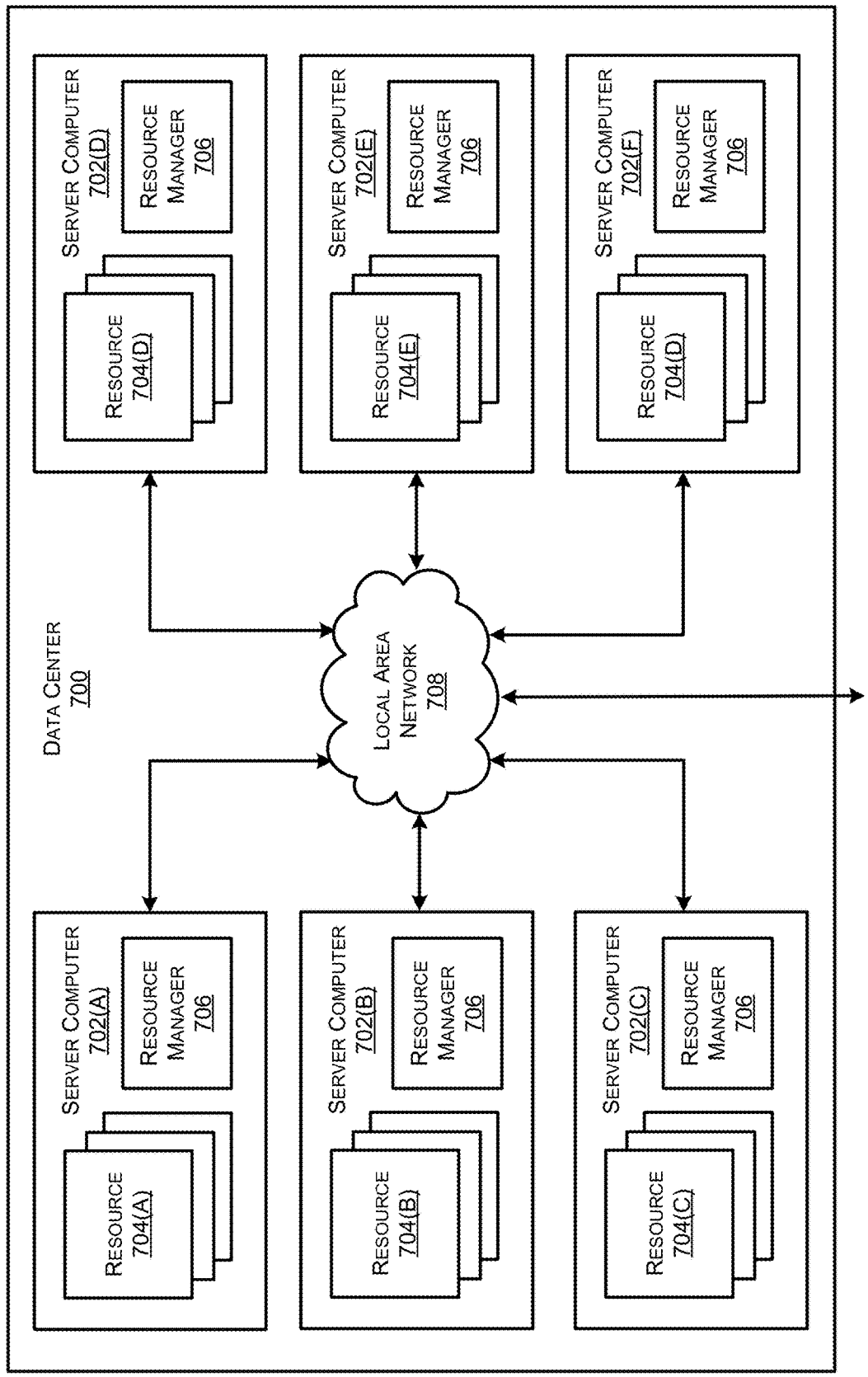
FIG. 7 illustrates a computing system diagram illustrating a configuration for a datacenter that can be utilized to implement aspects of the technologies disclosed herein.

FIG. 7 illustrates a computing system diagram illustrating a configuration for a datacenter 700 that can be utilized to implement aspects of the technologies disclosed herein. The example datacenter 700 shown in FIG. 7 includes several server computers 702A-702F (which might be referred to herein singularly as "a server computer 702" or in the plural as "the server computers 702) for providing computing resources. In some examples, the resources and/or server computers 702 may include, or correspond to, the any type of networked device described herein, such as datacenters 104-112 and/or server 404 described above. Although described as servers, the server computers 702 may comprise any type of networked device, such as servers, switches, routers, hubs, bridges, gateways, modems, repeaters, access points, etc.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, virtual private networks (VPNs), and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the datacenter 700 can also be configured to provide network services and other types of services.

In the example datacenter 700 shown in FIG. 7, an appropriate LAN 708 is also utilized to interconnect the server computers 702A-702F. It may be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between datacenters 700, between each of the server computers 702A-702F in each datacenter 700, and, potentially, between computing resources in each of the server computers 702. It may be appreciated that the configuration of the datacenter 700 described with reference to FIG. 7 is merely illustrative and that other implementations can be utilized.

In some examples, the server computers 702 and or the computing resources 704 may each execute/host one or more tenant containers and/or virtual machines to perform techniques described herein.

In some instances, the datacenter 700 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like tenant containers and VM instances, data storage resources, networking resources, data communication resources, network services, VPN instances, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one example by one or more datacenters 700 (which might be referred to herein singularly as "a datacenter 700" or in the plural as "the datacenters 700). The datacenters 700 are facilities utilized to house and operate computer systems and associated components. The datacenters 700 may include redundant and backup power, communications, cooling, and security systems. The datacenters 700 can also be located in geographically disparate locations. One illustrative example for a datacenter 700 that can be utilized to implement the technologies disclosed herein will be described below with regard to FIG. 8.

Figure 8:
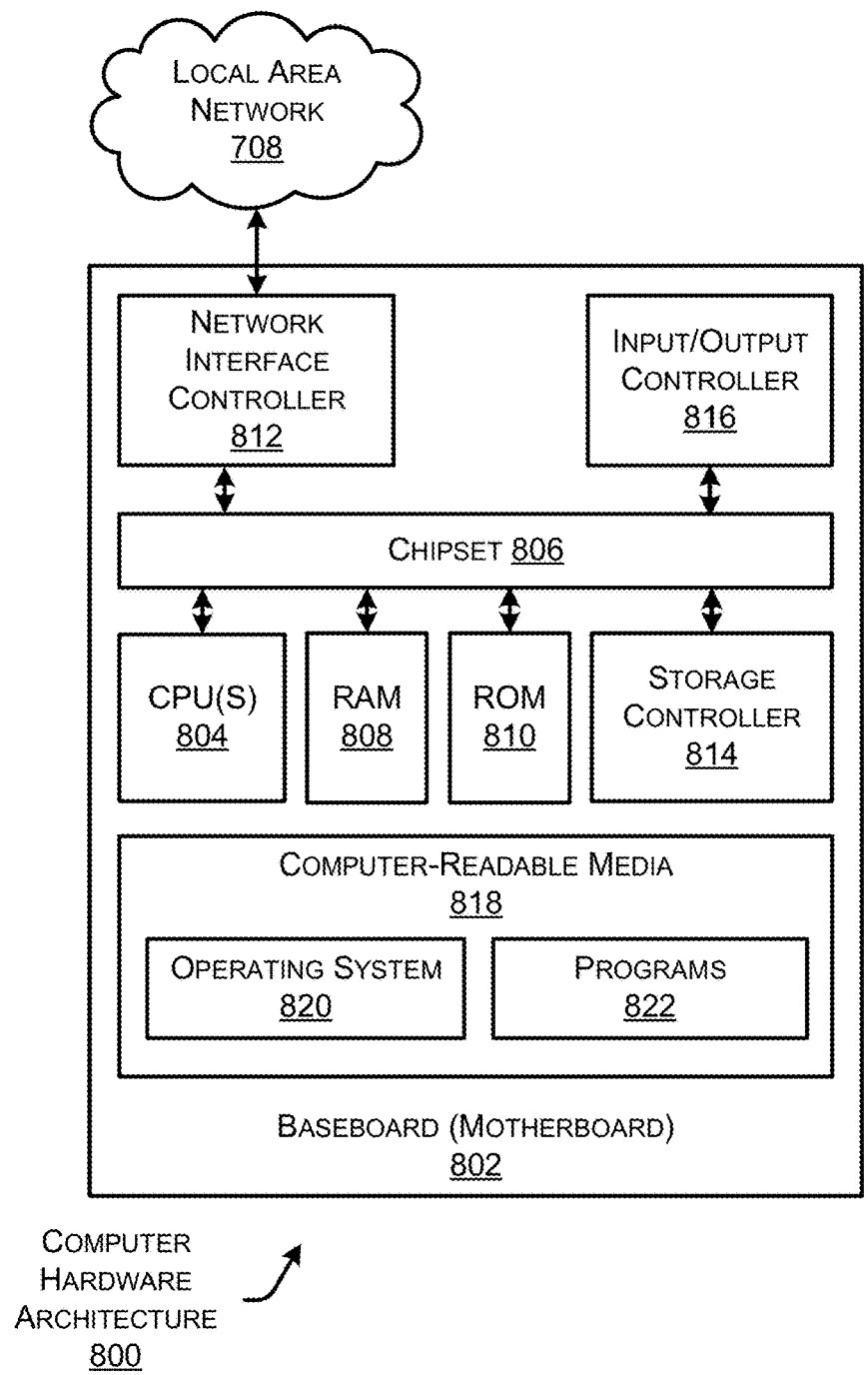
FIG. 8 illustrates a computer architecture diagram showing an example computer hardware architecture for implementing a computing device that can be utilized to implement aspects of the various technologies presented herein.

FIG. 8 illustrates a computer architecture diagram showing an example computer hardware architecture 800 for implementing a computing device that can be utilized to implement aspects of the various technologies presented herein. The computer hardware architecture 800 shown in FIG. 8 may be used to implement one or more computer servers configured to provide cloud services and/or other computing resources, such as datacenters 104-112, server 404, and/or server computer(s) 702 described above. Additionally or alternatively, the computer hardware architecture 800 may be used to implement a client device requesting cloud services from a distributed network, such as client device 102, client device 302, and/or client device 402 described above. Computer hardware architecture 800 may correspond to one or more of a computer workstation, desktop computer, laptop, tablet, network appliance, e-reader, smartphone, or other computing device, and can be utilized to execute any combination of the software components presented herein. The computer 800 may, in some examples, correspond to a network device, and may comprise networked devices such as servers, switches, routers, hubs, bridges, gateways, modems, repeaters, access points, etc.

The computer 800 includes a baseboard 802, or "motherboard," which is a printed circuit board to which a multitude of components or devices can be connected by way of a system bus or other electrical communication paths. In one illustrative configuration, one or more central processing units (CPUs) 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory (ROM) 810 or non-volatile RAM (NVRAM) for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the computing environment 100. The chipset 806 can include functionality for providing network connectivity through a Network Interface Controller (NIC) 812, such as a gigabit Ethernet adapter. The NIC 812 is capable of connecting the computer 800 to other computing devices over the computing environment 100. It may be appreciated that multiple NICs 812 can be present in the computer 800, connecting the computer to other types of networks and remote computer systems. In some examples, the NIC 812 may be configured to perform at least some of the techniques described herein, such as packet redirects and/or other techniques described herein.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different examples of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the storage device 818 described above, the computer 800 can have access to other computer-readable storage media to store and retrieve information, such as program modules, data structures, or other data. It may be appreciated by those skilled in the art that computer-readable storage media is any available media that provides for the non-transitory storage of data and that can be accessed by the computer 800. In some examples, the operations performed by the computing environment 100 and or any components included therein, may be supported by one or more devices similar to computer 800. Stated otherwise, some or all of the operations performed by the computing environment 100, and or any components included therein, may be performed by one or more computer devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one example, the operating system 820 comprises the LINUX operating system. According to another example, the operating system comprises the WINDOWS® SERVER operating system from MICROSOFT Corporation of Redmond, Wash. According to further examples, the operating system can comprise the UNIX operating system or one of its variants. It may be appreciated that other operating systems can also be utilized. The storage device 818 can store other system or application programs and data utilized by the computer 800.

In one example, the storage device 818 or other computer-readable storage media is encoded with computer-executable instructions which, when loaded into the computer 800, transform the computer from a general-purpose computing system into a special-purpose computer capable of implementing the examples described herein. These computer-executable instructions transform the computer 800 by specifying how the CPUs 804 transition between states, as described above. According to one example, the computer 800 has access to computer-readable storage media storing computer-executable instructions which, when executed by the computer 800, perform the various processes described above with regard to FIGS. 1-6. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As described herein, the computer 800 may comprise one or more of a client device 102 or 402, datacenters/server(s) 104 or 404, or a network device (e.g., server computer, computing resource, router, etc.). The computer 800 may include one or more hardware processor(s) such as the CPUs 804 configured to execute one or more stored instructions. The CPUs 804 may comprise one or more cores. Further, the computer 800 may include one or more network interfaces configured to provide communications between the computer 800 and other devices, such as the communications described herein as being performed by the client device 402 and/or a server 404 or other system within a datacenter 104-112, or a network device or other computing device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for selecting datacenters to provide cloud services based on data sovereignty policies. The programs 822 may enable the client devices 402 and/or server devices 404 to perform various operations described herein.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

What is claimed is:

1. A method comprising:
    receiving, at a first datacenter of a cloud computing network, a request from a client device to access a cloud service, wherein the first datacenter operates at a first location, and wherein the first datacenter is configured to provide the cloud service via a first instance of the cloud service executing on a first server;
    receiving, by the first datacenter, a data sovereignty requirement associated with the client device;
    determining that the first location does not comply with the data sovereignty requirement;
    determining a second server within a second datacenter of the cloud computing network, wherein the second datacenter is configured to provide the cloud service via a second instance of the cloud service executing on the second server, and wherein the second server operates at a second location;
    determining that the second location complies with the data sovereignty requirement; and
    transmitting, by the first datacenter, a network address associated with the second server to the client device, based at least in part on:
        (a) determining that the first location does not comply with the data sovereignty requirement associated with the client device; and
        (b) determining that the second location complies with the data sovereignty requirement associated with the client device.

2. The method of claim 1, further comprising:
    determining a plurality of servers within the cloud computing network based at least in part on the data sovereignty requirement, wherein the plurality of servers includes the second server; and
    transmitting to the client device a plurality of network addresses associated with the plurality of servers, wherein the plurality of network addresses includes the network address associated with the second server.

3. The method of claim 2, wherein determining the plurality of servers comprises:
    determining a location associated with each of the plurality of servers; and determining that the location associated with each of the plurality of servers complies with the data sovereignty requirement.

4. The method of claim 2, further comprising:
establishing a connection with the client device using the first instance of the cloud service executing on the first server;
receiving a response from the client device identifying the second server, wherein the response is received after transmitting the plurality of network addresses to the client device; and
initiating, by the first server, a migration of the connection to the second instance of the cloud service executing on the second server, based at least in part on the response.

5. The method of claim 4, further comprising:
receiving, by the first server, authentication data from the client device;
authenticating, by the first server, the client device using the first instance of the cloud service, based at least in part on the authentication data; and
prohibiting, by the first server, a transfer of data associated with the cloud service between the client device and the cloud computing network, until after the migration of the connection to the second instance of the cloud service.

6. The method of claim 1, further comprising:
determining, by the first datacenter, a plurality of additional servers within the cloud computing network configured to provide the cloud service, wherein the plurality of additional servers includes the second server;
receiving, by the first datacenter, location data associated with the plurality of additional servers;
determining, based at least in part on the location data, a first subset of the plurality of additional servers that complies with the data sovereignty requirement, and a second subset of the plurality of additional servers that does not comply with the data sovereignty requirement; and
transmitting, to the client device, network addresses associated with the first subset of servers, wherein network addresses associated with the second subset of servers are not transmitted to the client device.

7. The method of claim 1, further comprising:
determining a client location associated with the client device, based on a source IP address within the request, wherein transmitting the network address associated with the second server is further based at least in part on the client location.

8. The method of claim 1, wherein
the request from the client device includes a destination IP address that is shared by multiple servers within the cloud computing network, and
the network address associated with the second server is not shared by multiple servers within the cloud computing network.

9. The method of claim 1, wherein the cloud service is a cloud-based firewall service.

10. The method of claim 1, wherein the request received from the client device comprises a request transmitted via a DNS-based routing technique to shared destination address associated with at least the first server and the second server.

11. A method comprising:
transmitting, by a client device, a request to access a cloud-based service, using a first network address that is shared by multiple servers within a cloud computing network, wherein the client device is associated with a data sovereignty requirement;
receiving, by the client device, a response from a first server executing a first instance of the cloud-based service, the response including a second network address associated with a second server and a third network address associated with a third server, wherein the first server operates within a first datacenter at a location that does not comply with the data sovereignty requirement, wherein the second server executes a second instance of the cloud-based service at a second datacenter, wherein the third server executes a third instance of the cloud-based service at a third datacenter, and wherein the second server and the third server operate at locations that comply with the data sovereignty requirement;
transmitting, by the client device a first network probe to the second server using the second network address, and receiving a response to the first network probe;
transmitting, by the client device a second network probe to the third server using the third network address, and receiving a response to the second network probe;
transmitting, based at least in part on the response to the first network probe and the response to the second network probe, data to the first server identifying the second server; and
receiving, by the client device, data from the second instance of the cloud-based service executing on the second server.

12. The method of claim 11, further comprising:
transmitting authentication data to the first server;
establishing a connection between the client device and the first instance of the cloud-based service executing on the first server; and
using the connection to transmit data from the client device to the second instance of the cloud-based service executing on the second server.

13. The method of claim 11, further comprising selecting the second server based at least in part on:
comparing a first round-trip time of the first network probe to a second round-trip time of the second network probe.

14. A computer server comprising:
one or more processors; and
one or more non-transitory computer-readable media storing instructions that, when executed by the one or more processors, cause the one or more processors to perform operations comprising:
receiving a request from a client device to access a cloud service, wherein the computer server is a first server within a cloud computing network, wherein the computer server operates in a first datacenter configured to provide the cloud service via a first instance of the cloud service executing on the computer server;
receiving a data sovereignty requirement associated with the client device;
determining that a first location of the computer server does not comply with the data sovereignty requirement;
determining a second server within a second datacenter of the cloud computing network, wherein the second datacenter is configured to provide the cloud service via a second instance of the cloud service executing on the second server, and wherein the second server operates at a second location;

determining that the second location complies with the data sovereignty requirement; and transmitting a network address associated with the second server to the client device, based at least in part on:
  (a) determining that the first location does not comply with the data sovereignty requirement associated with the client device; and
  (b) determining that the second location complies with the data sovereignty requirement associated with the client device.

15. The computer server of claim 14, the operations further comprising:
  determining a plurality of servers within the cloud computing network based at least in part on the data sovereignty requirement, wherein the plurality of servers includes the second server; and
  transmitting to the client device a plurality of network addresses associated with the plurality of servers, wherein the plurality of network addresses includes the network address associated with the second server.

16. The computer server of claim 15, wherein determining the plurality of servers comprises:
  determining a location associated with each of the plurality of servers; and
  determining that the location associated with each of the plurality of servers complies with the data sovereignty requirement.

17. The computer server of claim 15, the operations further comprising:
  establishing a connection with the client device using the first instance of the cloud service executing on the computer server;
  receiving a response from the client device identifying the second server, wherein the response is received after transmitting the plurality of network addresses to the client device; and
  initiating a migration of the connection to the second instance of the cloud service executing on the second server, based at least in part on the response.

18. The computer server of claim 14, the operations further comprising:
  determining a plurality of additional servers within the cloud computing network configured to provide the cloud service, wherein the plurality of additional servers includes the second server;
  receiving location data associated with the plurality of additional servers;
  determining, based at least in part on the location data, a first subset of the plurality of additional servers that complies with the data sovereignty requirement, and a second subset of the plurality of additional servers that does not comply with the data sovereignty requirement; and
  transmitting, to the client device, network addresses associated with the first subset of servers, wherein network addresses associated with the second subset of servers are not transmitted to the client device.

19. The computer server of claim 14, wherein the request received from the client device comprises a request transmitted via a DNS-based routing technique to shared destination address associated with at least the first server and the second server.

20. The computer server of claim 19, wherein the network address associated with the second server is not a shared network address associated with multiple servers in the cloud computing network.

* * * * *